United States Patent
Kim et al.

(10) Patent No.: US 8,870,399 B2
(45) Date of Patent: *Oct. 28, 2014

(54) BACKLIGHT UNIT COMPRISING CONDENSING FILM HAVING HETERO-CONIC LENSES

(75) Inventors: Yune-Hyoun Kim, Daejeon (KR);
Kwang-Seung Park, Daejeon (KR);
Sang-Choll Han, Daejeon (KR);
Sang-Eun An, Daejeon (KR)

(73) Assignee: LG Chem, Ltd., Seoul (KR)

( * ) Notice: Subject to any disclaimer, the term of this patent is extended or adjusted under 35 U.S.C. 154(b) by 426 days.

This patent is subject to a terminal disclaimer.

(21) Appl. No.: 13/315,111

(22) Filed: Dec. 8, 2011

(65) Prior Publication Data

US 2012/0147289 A1    Jun. 14, 2012

(30) Foreign Application Priority Data

Dec. 9, 2010 (KR) .......................... 10-2010-0125563

(51) Int. Cl.
| | |
|---|---|
| *F21V 5/04* | (2006.01) |
| *G02F 1/1335* | (2006.01) |
| *G02B 3/00* | (2006.01) |
| *B29D 11/00* | (2006.01) |

(52) U.S. Cl.
CPC .... *G02F 1/133606* (2013.01); *G02F 1/133604* (2013.01); *G02F 1/133611* (2013.01); *G02B 3/0056* (2013.01); *G02F 2001/133607* (2013.01); *B29D 11/00788* (2013.01)
USPC ........... 362/97.1; 362/97.2; 362/331; 349/61

(58) Field of Classification Search
USPC ........................................ 362/97.1, 97.2, 331
See application file for complete search history.

(56) References Cited

U.S. PATENT DOCUMENTS

| | | | |
|---|---|---|---|
| 7,740,388 B2 * | 6/2010 | Chang | 362/606 |
| 2010/0128464 A1 * | 5/2010 | Joo et al. | 362/97.1 |
| 2010/0232142 A1 * | 9/2010 | Kim et al. | 362/97.2 |
| 2011/0019435 A1 * | 1/2011 | Teng et al. | 362/608 |

FOREIGN PATENT DOCUMENTS

KR    10-2011-0075465 A    7/2011

* cited by examiner

*Primary Examiner* — Sikha Roy
(74) *Attorney, Agent, or Firm* — Mckenna Long & Aldridge LLP

(57) ABSTRACT

Provided is a backlight unit. The backlight unit includes a light source, an optical member configured to uniformly distribute light emitted from the light source, and at least two condensing films configured to condense light from the optical member. Hetero-conic lenses are two-dimensionally arranged on a surface of each of the condensing films, and each of the hetero-conic lenses is formed by combining a first conic lens expressed by Formula (1) below and a second conic lens expressed by Formula (2) below:

$$y = H_1 - \frac{x^2/r_1}{1 + \sqrt{1-(1+k_1)(1/r_1)^2 x^2}} \quad (0 \le y \le y_0) \quad \text{Formula (1)}$$

$$y = H_2 - \frac{x^2/r_2}{1 + \sqrt{1-(1+k_2)(1/r_2)^2 x^2}} + y_0 \quad (y_0 \le y \le H_2). \quad \text{Formula (2)}$$

17 Claims, 4 Drawing Sheets

BACKLIGHT UNIT COMPRISING CONDENSING FILM HAVING HETERO-CONIC LENSES

CROSS-REFERENCE TO RELATED APPLICATIONS

This application claims the priority of Korean Patent Application No. 10-2010-0125563 filed on Dec. 9, 2010, in the Korean Intellectual Property Office, the disclosure of which is incorporated herein by reference.

BACKGROUND OF THE INVENTION

1. Field of the Invention

The present invention relates to a backlight unit, and more particularly, to a backlight unit including a condensing film on which hetero-conic lenses are two-dimensionally arranged to improve brightness and viewing angle characteristics.

2. Description of the Related Art

Liquid crystal displays (LCDs) are passive devices that cannot generate light and thus require backlight units as light sources. Due to the influence of the recent emphasis on environmentally-friendly technology, more attention is being paid to products having improved brightness characteristics while consuming the same or less electricity than related art products. Thus, a great deal of research into improving the bright characteristics of backlight units has been undertaken.

A common method used in the related art to improve the brightness of backlight units is to use condensing films such as prism sheets and lenticular sheets. Particularly, it is known that brightness characteristics can be markedly improved by using a stack of two prism sheets. In this case, however, viewing angle characteristics are deteriorated, although brightness characteristics can be improved. Use of a stack of two or three semispherical micro-lens array sheets is considered to prevent such a deterioration in viewing angle characteristics. However, brightness characteristics cannot be improved to satisfactory levels through only the semispherical micro-lens array sheets.

That is, what is needed are condensing sheets (films) that can sufficiently improve both the brightness and viewing angle of liquid crystal displays.

SUMMARY OF THE INVENTION

An aspect of the present invention provides a backlight unit including a condensing film on which hetero-conic lenses are arranged to improve brightness and viewing angle characteristics.

According to an aspect of the present invention, there is provided a backlight unit including: a light source; an optical member configured to uniformly distribute light emitted from the light source; and at least two condensing films configured to condense light from the optical member, wherein hetero-conic lenses are two-dimensionally arranged on a surface of each of the condensing films, and each of the hetero-conic lenses is formed by combining a first conic lens expressed by Formula (1) below and a second conic lens expressed by Formula (2) below:

$$y = H_1 - \frac{x^2/r_1}{1 + \sqrt{1 - (1+k_1)(1/r_1)^2 x^2}} \quad (0 \le y \le y_0) \quad \text{Formula (1)}$$

where $r_1$ denotes a radius of curvature at an imaginary apex of the first conic lens, $k_1$ denotes a conic constant of the first conic lens, and $H_1$ denotes a height from a bottom surface to the imaginary apex of the first conic lens, $$y = H_2 - \frac{x^2/r_2}{1 + \sqrt{1 - (1-k_2)(1/r_2)^2 x^2}} + y_0 \quad (y_0 \le y \le H_2) \quad \text{Formula (2)}$$

where $r_2$ denotes a radius of curvature at an apex of the second conic lens, $k_2$ denotes a conic constant of the second conic lens, $H_2$ denotes a height from a bottom surface to the apex of the second conic lens, and $y_0$ denotes a height measured from the bottom surface of the first conic lens to a position at which a diameter of a cross section of the first conic lens is equal to a diameter of the bottom surface of the second conic lens.

The radius of curvature $r_1$ may range from 2% to 65% of a diameter of the bottom surface of the first conic lens. Preferably, the radius of curvature $r_1$ may range from 2% to 50% of the diameter of the bottom surface of the first conic lens. More preferably, the radius of curvature $r_1$ may range from 2% to 30% of the diameter of the bottom surface of the first conic lens.

The conic constant $k_1$ ranges from $-2.6$ to $-1.2$. Preferably, the conic constant $k_1$ may range from $-2.6$ to $-1.4$. More preferably, the conic constant $k_1$ may range from $-2.6$ to $-1.6$.

The radius of curvature $r_2$ may range from 2% to 200% of the diameter of the bottom surface of the first conic lens. Preferably, the radius of curvature $r_2$ may range from 2% to 180% of the diameter of the bottom surface of the first conic lens. More preferably, the radius of curvature $r_2$ may range from 2% to 150% of the diameter of the bottom surface of the first conic lens. The conic constant $k_2$ may be different from the conic constant $k_1$ and may range from $-10,000$ to $-1.1$. Preferably, the conic constant $k_2$ may range from $-1,000$ to $-1.1$. More preferably, the conic constant $k_2$ may range from $-100$ to $-1.1$.

The hetero-conic lenses may be arranged in a honeycomb manner.

The optical member may be a diffusion plate or a light guide plate.

According to another aspect of the present invention, there is provided a liquid crystal display device including the backlight unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
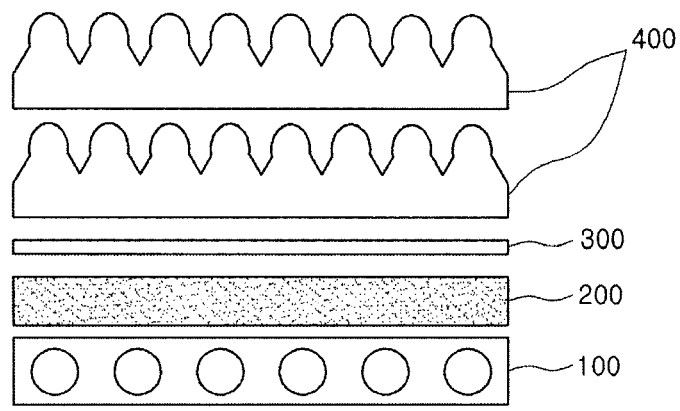
FIG. 1 is a view illustrating a backlight unit according to an embodiment of the present invention.

FIG. 1 is a view illustrating a backlight unit according to an embodiment of the present invention. Referring to FIG. 1, the backlight unit of the current embodiment includes a light source 100, an optical member 200, and condensing films 400. If necessary, the backlight unit may further include a diffusion film 300.

The light source 100 supplies light to the backlight unit. According to the position of the light source 100, the type of the light source 100 is determined. For example, the light source 100 may be an edge-type or direct-type light source. An edge-type light source or a direct-type light source may be used according to use thereof.

The optical member 200 uniformly distributes light emitted from the light source 100. Generally, a point or line light source is used as a light source of a backlight unit. In this case, a region close to the light source (for example, a lamp) is bright and a region distant from the light source is relatively dark. This is known as "lamp mura." The optical member 200 is used to reduce lamp mura by uniformly distributing light emitted from the light source 100 to the entirety of a screen. If the light source 100 is an edge-type light source, a light guide plate is generally used as the optical member 200, and if the light source 100 is a direct-type light source, a diffusion plate is generally used as the optical member 200.

The diffusion film 300 may be additionally disposed between the optical member 200 and the condensing films 400 as shown in FIG. 1, or a diffusion film (not shown) may be additionally disposed on top of the condensing films 400. If necessary, any other optical film may be used in addition to the diffusion film.

The condensing films 400 are used to condense light toward the front of a display. In the current embodiment, the condensing films 400 include two-dimensionally arranged hetero-conic lenses. The hetero-conic lenses include first lenses expressed by Formula (1) and second lenses expressed by Formula (2).

Figure 2:
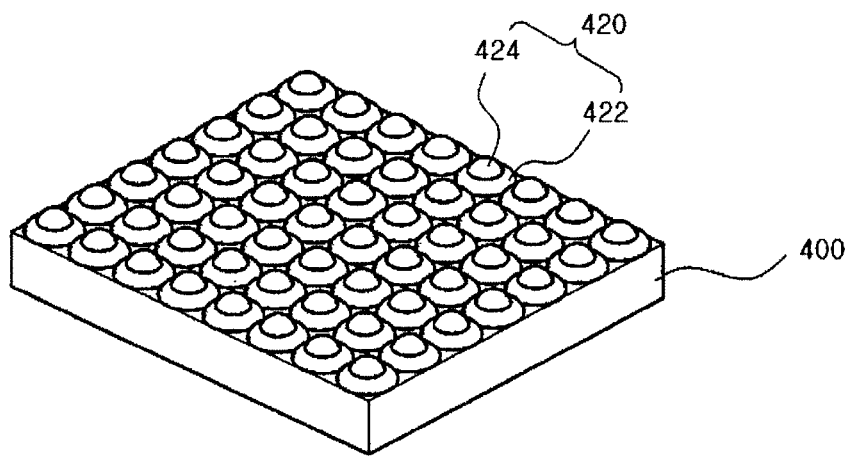
FIG. 2 is a view illustrating a condensing film according to an embodiment of the present invention.

FIG. 2 is view illustrating a condensing film 400 according to an embodiment of the present invention. Referring to FIG. 2, the condensing film 400 includes a plurality of hetero-conic lenses 420. The hetero-conic lenses 420 are two-dimensionally arranged on a surface of the condensing film 400.

The term "hetero-conic lens" refers to a combination of different conic lenses. In addition, the term "conic lens" is used to denote a lens having a curved shape. Examples of conic lenses include semispherical lenses, elliptical lenses, parabolic lenses, and hyperbolic lenses. Generally, the shape of a conic lens is expressed by a function of a radius of curvature (r) at the apex of the lens and a conic constant (k) of the lens. The conic constant k is a factor determining the shape of the lens: k=0 refers to a circular shape; k=−1 refers to a parabolic shape; −1<k<0 refers to an elliptical shape; and k<−1 refers to a hyperbolic shape.

The hetero-conic lenses 420 include conic lenses having different shapes expressed by different lens formulas. For clarity in description, when conic lenses forming lower portions of the hetero-conic lenses 420 are referred to as first conic lenses 422, and conic lenses forming upper portions of the hetero-conic lenses 420 are referred to as second conic lenses 424, the hetero-conic lenses 420 may be formed by combining the first conic lenses 422 and the second conic lenses 424. The first conic lenses 422 are expressed by Formula (1) below, and the second conic lenses 424 are expressed by Formula (2) below.

$$y = H_1 - \frac{x^2/r_1}{1+\sqrt{1-(1+k_1)(1/r_1)^2 x^2}} \quad (0 \le y \le y_0) \qquad \text{Formula (1)}$$

Figure 3:
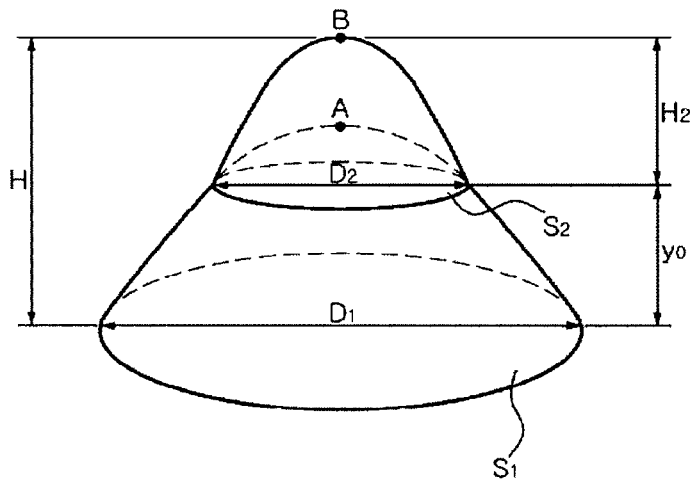
FIG. 3 is a view illustrating a hetero-conic lens according to an embodiment of the present invention.

In Formula (1), $r_1$ denotes a radius of curvature at an imaginary apex (A) of the first conic lens, $k_1$ denotes a conic constant of the first conic lens, and $H_1$ denotes a height measured from the bottom surface to the imaginary apex (A) of the first conic lens. The term "imaginary apex" refers to a point denoted by (A) in FIG. 3. That is, the imaginary apex (A) is a not real point but a theoretical apex of the first conic lens expressed by Formula (1).

$$y = H_2 - \frac{x^2/r_2}{1+\sqrt{1-(1-k_2)(1/r_2)^2 x^2}} + y_0 \quad (y_0 \le y \le H_2) \qquad \text{Formula (2)}$$

In Formula (2), $r_2$ denotes a radius of curvature at an apex (B) of the second conic lens, $k_2$ denotes a conic constant of the second conic lens, $H_2$ denotes a height measured from a bottom surface $S_2$ to the apex (B) of the second conic lens, and $y_0$ denotes a height at which the diameter of a cross section of the first conic lens is equal to a diameter $D_2$ of the bottom surface $S_2$ of the second conic lens. In other words, $y_0$ denotes a height measured from the bottom surface $S_1$ of the first conic lens to the bottom surface $S_2$ of the second conic lens.

In a case in which the first conic lens is expressed by Formula (1), $r_1$ may be about 2% to about 65% of a bottom surface diameter $D_1$ of the first conic lens. Preferably, $r_1$ may be about 2% to about 50% of the bottom surface diameter $D_1$ of the first conic lens. More preferably, $r_1$ may be about 2% to about 30% of the bottom surface diameter $D_1$ of the first conic lens. If $r_1$ is smaller than 2% of the bottom surface diameter $D_1$ of the first conic lens, although central brightness may increase, brightness decreases and then increases as the viewing angle increases (this brightness variation is known as side lobe). If $r_1$ is greater than 65%, although a wide viewing angle can be obtained without the possibility of side lobe, the maximum brightness level is lowered as compared with the maximum brightness level of the related art in which two optical sheets including semispherical micro-lens arrays are used.

$k_1$ may range from about −2.6 to about −1.2. Preferably, $k_1$ may range from about −2.6 to about −1.4. More preferably, $k_1$ may range from about −2.6 to about −1.6. If $k_1$ is smaller than −2.6 or greater than −1.2, the maximum brightness level is lowered as compared with the maximum brightness level of the related art in which two optical sheets including semispherical micro-lens arrays are used.

In a case in which the second conic lens is expressed by Formula (2), $r_2$ may be about 2% to about 200% of the bottom surface diameter $D_1$ of the first conic lens. Preferably, $r_2$ may be about 2% to about 180% of the bottom surface diameter $D_1$ of the first conic lens. More preferably, $r_2$ may be about 2% to about 150% of the bottom surface diameter $D_1$ of the first conic lens. If $r_2$ is smaller than 2% of the bottom surface diameter $D_1$ of the first conic lens, although central brightness increases, strong side lobe occurs as the viewing angle increases. If $r_2$ is greater than 200%, the effect of $r_2$ is insignificant in the second conic lens. $k_2$ has a value different from that of $k_1$. $k_2$ may range from about −10,000 to about −1.1. Preferably, $k_2$ may range from about −1,000 to about −1.1. More preferably, $k_2$ may range from about −100 to about −1.1. If $k_2$ is smaller than −10,000, the effect of $k_2$ is significant in the second conic lens. If $k_2$ is greater than −1.1, the maximum brightness level is lowered as compared with the maximum brightness level of the related art in which two optical sheets including semispherical micro-lens arrays are used.

Figure 4:
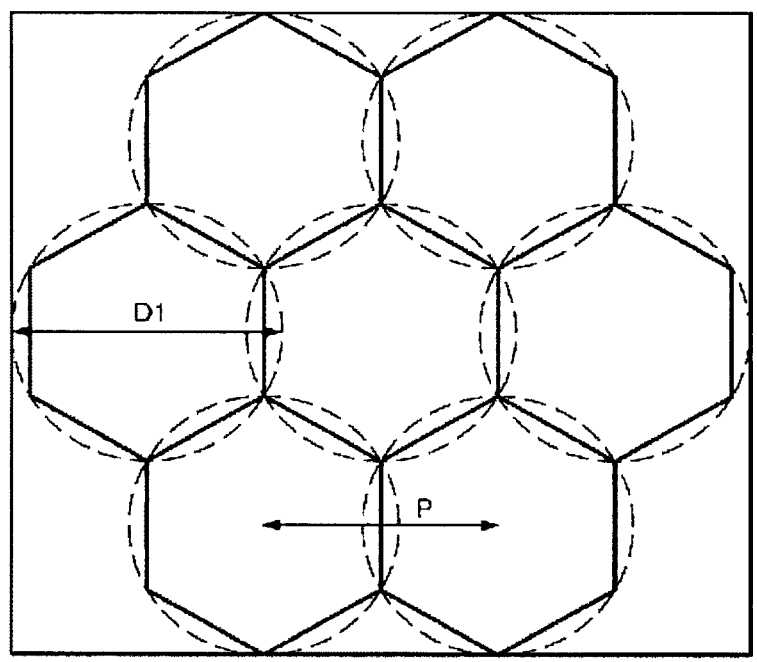
FIG. 4 is a cross-sectional view illustrating an exemplary arrangement of hetero-conic lenses to an embodiment of the present invention.

Generally, the hetero-conic lenses 420 of the present invention may be arranged at a pitch (P) of about 10 μm to about 500 μm. The pitch (P) refers to a distance between the centers of the bottom surfaces of neighboring hetero-conic lenses as shown in FIG. 4. If the pitch (P) is smaller than 10 μm, it is difficult to fabricate lens dies. If the pitch (P) is greater than 500 μm, the heights of hetero-conic lenses 420 increase, and thus, the volumes of the hetero-conic lenses 420 increase. This may increase manufacturing costs. Furthermore, in this case, the contours of the hetero-conic lenses 420 may easily be seen from the outside, and light may not be uniformly distributed and thus the aesthetic appearance of a display may be spoiled.

The two-dimensional arrangement of the hetero-conic lenses 420 is not limited to any particular pattern. The hetero-conic lenses 420 may be two-dimensionally arranged in any pattern selected by a designer. FIG. 4 is a view illustrating an exemplary arrangement of the hetero-conic lenses 420 according to an embodiment of the present invention. In FIG. 4, an exemplary arrangement of the bottom surfaces of the hetero-conic lenses 420 is shown. The hetero-conic lenses 420 may be shaped and arranged in a honeycomb manner as shown in FIG. 4. In this case, gaps between the hetero-conic lenses 420 can be minimized, and light may be effectively condensed as compared with other arrangements. Alternatively, the hetero-conic lenses 420 may be arranged with slight gaps therebetween.

The bottom surface diameter $D_1$ of the first conic lenses 422 forming the lower portions of the hetero-conic lenses 420, may be varied according to the two-dimensional arrangement of the hetero-conic lenses 420 and/or the pitch (P) between the hetero-conic lenses 420. The two-dimensional arrangement and pitch (P) of the hetero-conic lenses 420 may be determined by a designer in consideration of purposes, usages, types of devices in which the hetero-conic lenses 420 are to be used, manufacturing processes, etc.

According to an embodiment of the present invention, the bottom surface diameter $D_1$ of the first conic lenses 422 of the hetero-conic lenses 420 may be about 95% to 116% of the pitch (P) of the hetero-conic lenses 420. Preferably, the bottom surface diameter $D_1$ of the first conic lenses 422 may be about 98% to 116% of the pitch (P) of the hetero-conic lenses 420. More preferably, the bottom surface diameter $D_1$ of the first conic lenses 422 may be about 100% to 116% of the pitch (P) of the hetero-conic lenses 420. If the bottom surface diameter $D_1$ of the first conic lenses 422 is smaller than 95% of the pitch (P) of the hetero-conic lenses 420, the maximum brightness level is lowered as compared with the maximum brightness level of the related art in which a stack of two optical sheets including semispherical micro-lens arrays is used. If the bottom surface diameter $D_1$ of the first conic lenses 422 is greater than 116%, since there is no gap between the first conic lenses 422 shaped and arranged in a honeycomb manner, it may be practically difficult to form the hetero-conic lenses 420.

In addition, the bottom surface diameter $D_2$ of the second conic lenses 424 may range from about 7% to about 76% of the bottom surface diameter $D_1$ of the first conic lenses 422. Preferably, the bottom surface diameter $D_2$ of the second conic lenses 424 may range from about 10% to about 76% of the bottom surface diameter $D_1$ of the first conic lenses 422. More preferably, the bottom surface diameter $D_1$ of the first conic lenses 422 may range from about 10% to 35% of the bottom surface diameter $D_1$ of the first conic lenses 422. If the bottom surface diameter $D_2$ of the second conic lenses 424 is smaller than 7% of the bottom surface diameter $D_1$ of the first conic lenses 422, the effect of a hetero conic structure is insignificant, and thus it is difficult to prevent a generation of side lobe and improve brightness. If the bottom surface diameter $D_2$ of the second conic lenses 424 is greater than 76% of the bottom surface diameter $D_1$ of the first conic lenses 422, the maximum brightness level is low as compared with the maximum brightness level of the related art in which a stack of two optical sheets including semispherical micro-lens arrays is used.

The condensing film 400 may be formed of any material as long as the material is transparent. For example, the condensing film 400 may be formed of a material such as a resin, a plastic material, or glass. Examples of the resin include urethane acrylate, epoxy acrylate, ester acrylate, a radical-generating monomer, and a combination thereof. The plastic material may be one or two selected from the group consisting of polymethylmethacrylate (PMMA), polycarbonate (PC), polystyrene (PS), polyethylene terephthalate (PET), and a copolymer of PC, PMMA, and PS. The glass may be silica or silicate formed by adding an oxide such as $Li_2O$, $B_2O_3$, CaO, $K_2O$, or MgO to $SiO_2$.

Methods of manufacturing a condensing film having hetero-conic lenses on its one side such as the condensing film 400 of the present invention are well known in the related art. The condensing film 400 of the present invention may be manufactured using such well-known methods. That is, the condensing film 400 of the present invention is not limited to a particular manufacturing method. For example, the condensing film 400 may be manufactured by injecting a curable resin between a base material and an intaglio die and hardening the curable resin using ultraviolet rays or heat. In another example, the condensing film 400 may be manufactured by fabricating an intaglio die, pouring a molten plastic material or glass into the die, and cooling the plastic material or glass. In another example, the condensing film 400 may be manufactured through an etching process such as a reactive ion etching (RIE) process using glass.

The brightness and viewing angle of the backlight unit of the present invention can be improved by using the above-described condensing film 400. Particularly, if a stack of two condensing films 400 is used in the backlight unit, such an improvement can be more significant. In the present invention, the condensing film 400 can improve the brightness and viewing angle of the backlight unit due to the following reasons. Since the condensing film 400 has a two dimensionally arranged structure, good viewing angle characteristics can be obtained as compared with the case of using a prism sheet or lenticular lens sheet having a one-dimensional arrangement structure. In addition, since the lenses of the condensing film 400 of the present invention have two radii of curvature, light recycling (described below) that occurs on lens surfaces can be reduced. In the case of a micro-array lens, a lenticular lens, or a prismatic lens, a considerable amount of light may be entirely or partially reflected along the single radius of curvature or slope of the lens back to a light source, a reflection layer, or a lower structure (light recycling). If the recycled light is incident on the same radius of curvature or slope of the lens, the light may likely be recycled again. However, in the case of a lens having two or more radii of curvature like the hetero-conic lens of the present invention, light totally reflected along a first radius of curvature may not be totally reflected along a second radius of curvature, and light totally reflected along the second radius of curvature may not be totally reflected along the first radius of curvature. Therefore, light recycling can be reduced as compared with the case of a lens having a single radius of curvature, and thus, more light can be extracted to increase brightness. This effect may be more significant if a stack of two or more condensing films is used.

The above-described backlight unit of the present invention can be used in a liquid crystal display. In this case, the brightness and viewing angle characteristics of the liquid crystal display can be improved, and thus, high-quality images can be provided.

Hereinafter, specific examples will be given for further understanding of the present invention.

Example 1

Condensing films on which hetero-conic lenses were two-dimensionally arranged in a honeycomb manner were formed. Each of the hetero-conic lenses included a combination of a first conic lens expressed by Formula (1) and a second conic lens expressed by Formula (2) under the conditions of P=50 μm, $D_1$=58 μm, $D_2$=7.5 μm, $r_1$=8.5 μm, $k_1$=−1.79, $H_1$=23.6 μm, $r_2$=8.6 μm, $k_2$=−4.56, $H_2$=0.7 μm, and $y_0$=22.8 μm.

Example 2

Condensing films on which hetero-conic lenses were two-dimensionally arranged in a honeycomb manner were formed. Each of the hetero-conic lenses included a combination of a first conic lens expressed by Formula (1) and a second conic lens expressed by Formula (2) under the conditions of P=50 μm, $D_1$=51 μm, $D_2$=6.6 μm, $r_1$=8.5 μm, $k_1$=−1.79, $H_1$=19.9 μm, $r_2$=130 μm, $k_2$=−4.56, $H_2$=0.04 μm, and $y_0$=19.3 μm.

Example 3

Condensing films were formed, which had the same structure as the condensing films of Example 2 except for $D_1$=49 μm, $H_1$=18.8 μm, and $y_0$=18.2 μm.

Example 4

Condensing films were formed, which had the same structure as the condensing films of Example 1 except for $D_2$=44.1 μm, $r_1$=37 μm, $k_1$=−2.38, $H_1$=9.6 μm, $r_2$=6.3 μm, $k_2$=−2.04, $H_2$=16.4 μm, and $y_0$=3.7 μm.

Example 5

Condensing films on which hetero-conic lenses were two-dimensionally arranged in a honeycomb manner were formed. Each of the hetero-conic lenses included a combination of a first conic lens expressed by Formula (1) and a second conic lens expressed by Formula (2) under the conditions of P=50 μm, $D_1$=54 μm, $D_2$=7.6 μm, $r_1$=13.5 μm, $k_1$=−1.26, $H_1$=22.3 μm, $r_2$=42 μm, $k_2$=−5.43, $H_2$=0.2 μm, and $y_0$=21.8 μm.

Example 6

Condensing films were formed, which had the same structure as the condensing films of Example 1 except for $D_2$=8.7 μm, $r_1$=0.1 μm, $k_1$=−2.65, $H_1$=22.5 μm, $r_2$=46.2 μm, $k_2$=−5.05, $H_2$=0.2 μm, and $y_0$=19.2 μm.

Example 7

Condensing films on which hetero-conic lenses were two-dimensionally arranged in a honeycomb manner were formed. Each of the hetero-conic lenses included a combination of a first conic lens expressed by Formula (1) and a second conic lens expressed by Formula (2) under the conditions of P=50 μm, $D_1$=56 μm, $D_2$=5.6 μm, $r_1$=3 μm, $k_1$=−1.94, $H_1$=25.8 μm, $r_2$=3 μm, $k_2$=−4.47, $H_2$=0.9 μm, and $y_0$=24.7 μm.

Example 8

Condensing films were formed, which had the same structure, as the condensing films of Example 1 except for $D_2$=18 μm, $r_1$=9.5 μm, $k_1$=−2.14, $H_1$=20.1 μm, $r_2$=4 μm, $k_2$=−1.11, $H_2$=9 μm, and $y_0$=16.5 μm.

Comparison Example 1

Condensing films on which semispherical lenses having a radius of 25 μm were two-dimensionally arranged at a pitch of 50 μm like a honeycomb were formed instead of condensing films including hetero-conic lenses.

Comparison Example 2

Condensing films on which prismatic lenses having an apex angle of 90° were arranged at a pitch of 50 μm were formed instead of condensing films including hetero-conic lenses.

Comparison Example 3

Condensing films were formed, which had the same structure as the condensing films of Example 3 except for $D_1$=47 μm, $H_1$=17.8 μm, and $y_0$=17.2 μm.

Comparison Example 4

Condensing films were formed, which had the same structure as the condensing films of Example 4 except for $r_1$=38.3 μm, $H_1$=9.4 μm, and $y_0$=3.6 μm.

Comparison Example 5

Condensing films were formed, which had the same structure as the condensing films of Example 5 except for $k_1$=−1.15, $H_1$=23.8 μm, $y_0$=23.3 μm.

Comparison Example 6

Condensing films were formed, which had the same structure as the condensing films of Example 6 except for $k_1$=−2.7, $H_1$=22.2 μm, and $y_0$=18.9 μm.

Comparison Example 7

Condensing films were formed, which had the same structure as the condensing films of Example 4 except for $D_2$=45.2 µm, $H_2$=16.9 µm, and $y_0$=3.4 µm.

Comparison Example 8

Condensing films were formed, which had the same structure as the condensing films of Example 7 except for $D_2$=1.7 µm, $r_1$=1 µm, $H_1$=27.8 µm, $r_2$=1 µm, $H_2$=0.2 µm, and $y_0$=27.5 µm.

Comparison Example 9

Condensing films were formed, which had the same structure as the condensing films of Example 8 except for $k_2$=−1 and $H_2$=10.1 µm.

Experimental Example 1

In each of Examples 1 to 8 and Comparative Examples 1 to 9, central brightness values when two of the condensing films were stacked on a backlight unit were measured through simulations using a ray-tracing program (Tracepro by Lambda Research Co.). The results of the measurements are shown in Table 1 below. In the case of prism condensing films (Comparative Example 2), prismatic lenses were perpendicularly arranged.

Simulation conditions are as follows.
1. A backlight unit including sixteen cold cathode fluorescent lamps (CCFLs) arranged at intervals of 28 mm was used as a light source.
2. In each measurement, a polystyrene diffusion plate having a thickness of 2 mm and haze of 80%, and a diffusion film were stacked on the backlight unit, and the two condensing films were stacked.

TABLE 1

|  | Central Brightness[a.u.] |
| --- | --- |
| Example 1 | 70.1 |
| Example 2 | 66.9 |
| Example 3 | 65.5 |
| Example 4 | 64.9 |
| Example 5 | 64.2 |
| Example 6 | 63.8 |
| Example 7 | 68.6 |
| Example 8 | 65.0 |
| Comparison Example 1 | 63.6 |
| Comparison Example 2 | 94.1 |
| Comparison Example 3 | 62.6 |
| Comparison Example 4 | 60.3 |
| Comparison Example 5 | 60.1 |
| Comparison Example 6 | 63.0 |
| Comparison Example 7 | 61.8 |
| Comparison Example 8 | 67.5 |
| Comparison Example 9 | 62.1 |

Experimental Example 2

Figure 5:
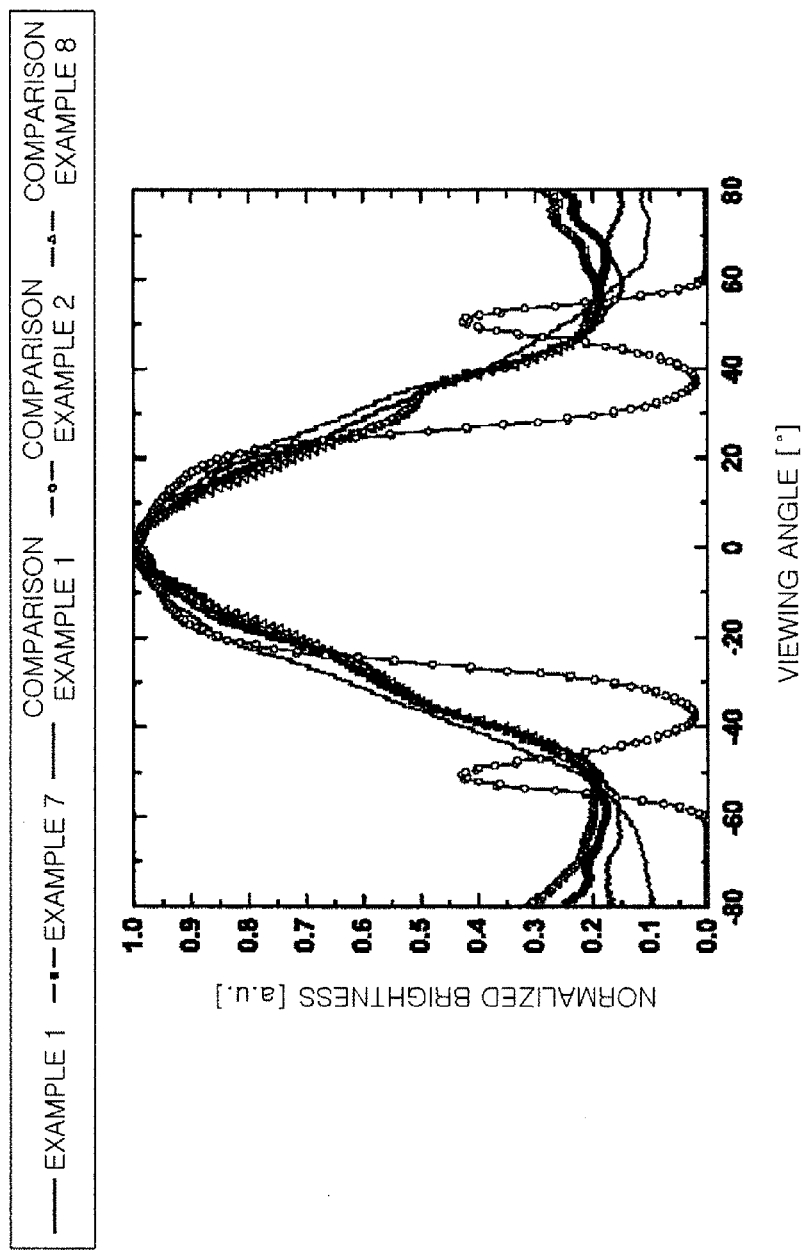
FIG. 5 is a graph showing relationships between brightness and horizontal view angles of condensing films of Examples 1 and 7 of the present invention and Comparison Examples 1, 2, and 8.
Figure 6:
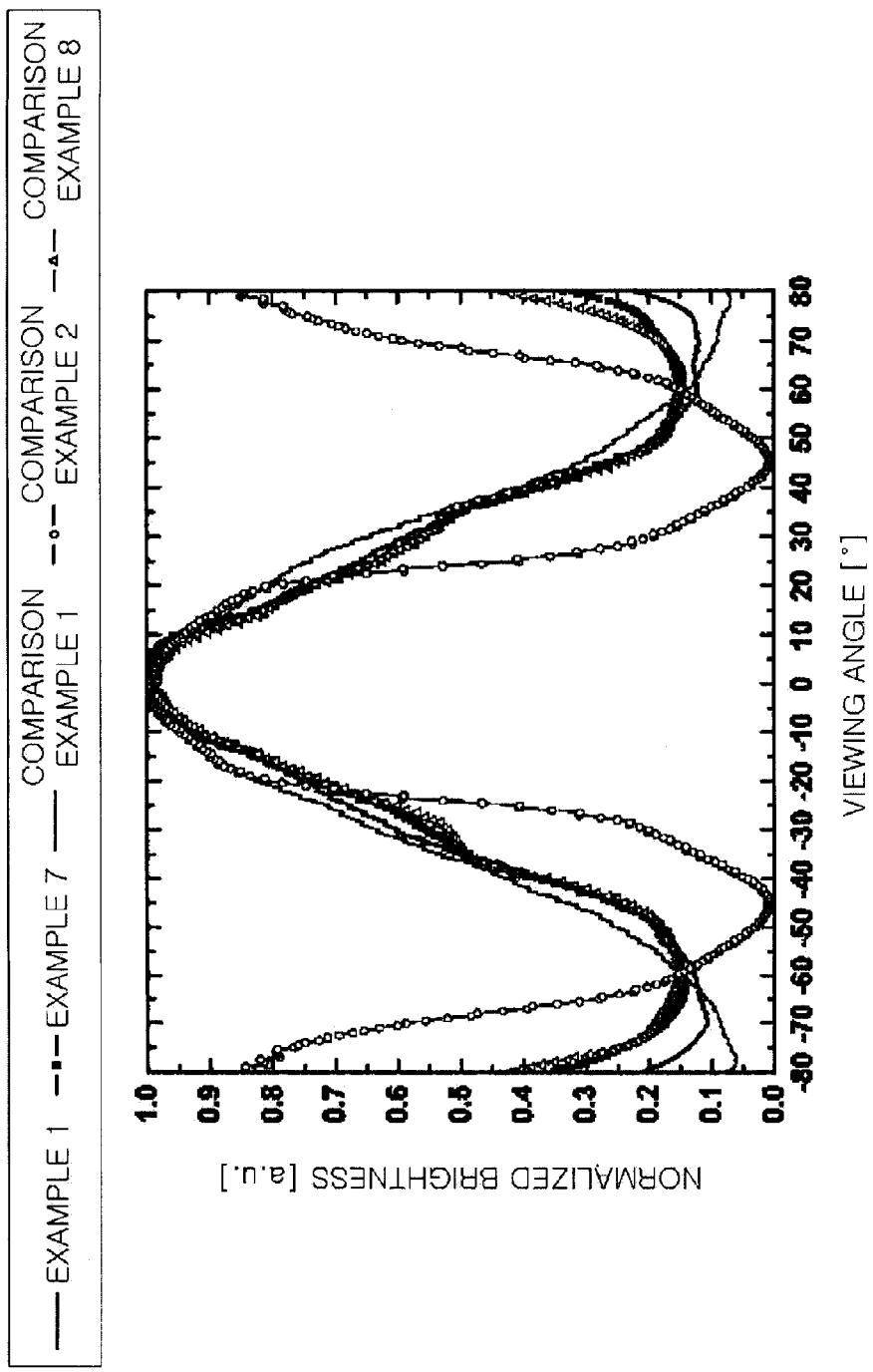
FIG. 6 is a graph showing relationships between brightness and vertical view angles of condensing films of Examples 1 and 7 of the present invention and Comparison Examples 1, 2, and 8.

In each of Examples 1 and 7 and Comparative Examples 1, 2, and 8, for a case in which two of the condensing films were stacked on the backlight unit, brightness was measured with respect to horizontal and vertical viewing angles through simulations using a ray-tracing program (Tracepro by Lambda Research Co.). FIG. 5 shows the measured brightness with respect to the horizontal viewing angle, and FIG. 6 shows the measured brightness with respect to the vertical viewing angle. In FIGS. 5 and 6, normalized brightness values are shown for convenience in comparison of Examples and Comparative Examples.

Referring to the measurement results shown in FIGS. 5 and 6 and Table 1, brightness and viewing angle characteristics are improved in the case of using the condensing films including hetero-conic lenses of the present invention and properly adjusting design factors as compared with the case of using condensing films of the related art.

According to the present invention, since the backlight unit includes the condensing film on which hetero-conic lenses each formed by combining different lenses are two-dimensionally arranged, the brightness of the backlight unit can be increased, and viewing angle characteristics of the backlight unit can be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A backlight unit comprising:
   a light source;
   an optical member configured to uniformly distribute light emitted from the light source; and
   at least two condensing films configured to condense light from the optical member,
   wherein hetero-conic lenses are two-dimensionally arranged on a surface of each of the condensing films, and each of the hetero-conic lenses is formed by combining a first conic lens expressed by Formula (1) below and a second conic lens expressed by Formula (2) below:

$$y = H_1 - \frac{x^2/r_1}{1+\sqrt{1-(1+k_1)(1/r_1)^2 x^2}} \quad (0 \le y \le y_0) \quad \text{Formula (1)}$$

where $r_1$ denotes a radius of curvature at an imaginary apex of the first conic lens, $k_1$ denotes a conic constant of the first conic lens, and $H_1$ denotes a height from a bottom surface to the imaginary apex of the first conic lens, $$y = H_2 - \frac{x^2/r_2}{1+\sqrt{1-(1-k_2)(1/r_2)^2 x^2}} + y_0 \quad (y_0 \le y \le H_2) \quad \text{Formula (2)}$$

where $r_2$ denotes a radius of curvature at an apex of the second conic lens, $k_2$ denotes a conic constant of the second conic lens, $H_2$ denotes a height from a bottom surface to the apex of the second conic lens, and $y_0$ denotes a height measured from the bottom surface of the first conic lens to a position at which a diameter of a cross section of the first conic lens is equal to a diameter of the bottom surface of the second conic lens.

2. The backlight unit of claim 1, wherein the radius of curvature $r_1$ ranges from 2% to 65% of a diameter of the bottom surface of the first conic lens.

3. The backlight unit of claim 2, wherein the radius of curvature $r_1$ ranges from 2% to 50% of the diameter of the bottom surface of the first conic lens.

4. The backlight unit of claim 3, wherein the radius of curvature $r_1$ ranges from 2% to 30% of the diameter of the bottom surface of the first conic lens.

5. The backlight unit of claim 1, where the conic constant $k_1$ ranges from −2.6 to −1.2.

6. The backlight unit of claim 5, where the conic constant $k_1$ ranges from −2.6 to −1.4.

7. The backlight unit of claim 6, where the conic constant $k_1$ ranges from −2.6 to −1.6.

8. The backlight unit of claim 1, wherein the radius of curvature $r_2$ ranges from 2% to 200% of the diameter of the bottom surface of the first conic lens.

9. The backlight unit of claim 8, wherein the radius of curvature $r_2$ ranges from 2% to 180% of the diameter of the bottom surface of the first conic lens.

10. The backlight unit of claim 9, wherein the radius of curvature $r_2$ ranges from 2% to 150% of the diameter of the bottom surface of the first conic lens.

11. The backlight unit of claim 1, wherein the conic constant $k_2$ is different from the conic constant $k_1$ and ranges from −10,000 to −1.1.

12. The backlight unit of claim 11, where the conic constant $k_2$ ranges from −1,000 to −1.1.

13. The backlight unit of claim 12, where the conic constant $k_2$ ranges from −100 to −1.1.

14. The backlight unit of claim 1, wherein the hetero-conic lenses are arranged in a honeycomb manner.

15. The backlight unit of claim 1, wherein the optical member is a diffusion plate.

16. The backlight unit of claim 1, wherein the optical member is a light guide plate.

17. A liquid crystal display device comprising the backlight unit of claim 1.

* * * * *